United States Patent Office 3,544,357
Patented Dec. 1, 1970

3,544,357
METHOD OF MANUFACTURING SOFT AND
FLEXIBLE SHEET MATERIALS
Kazuo Noda, Yuya Enomoto, and Osamu Fukushima,
Kurashiki, Japan, assignors to Kurashiki Rayon Co.,
Ltd., Sakazu, Kurashiki, Japan
No Drawing. Filed May 15, 1967, Ser. No. 638,564
Claims priority, application Japan, May 27, 1966,
41/34,156; June 9, 1966, 41/37,383
Int. Cl. B44d 1/44; D06h 3/14
U.S. Cl. 117—63
8 Claims

ABSTRACT OF THE DISCLOSURE

A method of manufacturing synthetic leather-like sheet materials having homogeneous porous structure, flexibility substantialness, drapability and strength by applying a solution of polyurethane elastomer or a polymer mixture containing not less than 50% of polyurethane elastomer, which contains boric acid or polyethylene glycol having an average molecular weight of 200 to 10,000, to a substratum and then coagulated said solution by wet process.

---

The present invention relates to a method of manufacturing soft, flexible and drapable sheet materials by wet coagulation of a polymer solution consisting essentially of a polyuretnane elastomer which contains boric acid or polyethylene glycol.

Generally, in the manufacture of leather-like sheets materials from a solution of polyurethane elastomer, wet coagulation has been adopted because it is necessary that said sheet materials have softness, flexibility, moisture permeability and other properties. However, if wet coagulation is accomplished by merely dipping a polyurethane elastomer solution in a non-solvent, it can not be avoided that the initial coagulation of the surface layer is quick, while the internal coagulation is slow and it is difficult to obtain any sheet of uniform porous structure.

An object of this invention is to provide a method of manufacturing sheet materials which possess porous structures which are homogeneous and uniform in the direction of thickness and which also satisfy the requriements for softness, flexibility, substantialness, thick touch, drapability, toughness, etc.

Considering the foregoing requirements, the present inventors have made extensive studies and have found as the result that sheet materials which possess uniform and homogeneous porous structures and combine flexibility and substantialness with drapability are obtained by adding boric acid or a polyethylene glycol having an average molecular weight of from 200 to 10,000, preferably from 700 to 10,000, to a solution usually containing from 15 to 30 percent of a polyurethane elastomer, and then by coagulating the mixture by wet process. Because the porous structures are uniform throughout the shaped article, the solvent can be readily washed off. Even if drying is effected while remaining some amount of the solvent, the porous structures will hardly be broken thereby.

It is considered that the reason why such effects can be obtained by the addition of boric acid or polyethylene glycol is based on the fact that boric acid or polyethylene glycol is hydrophilic, so that the coagulation liquid permeates quickly into the polyurethane elastomer solution and the initial coagulation is slow. Accordingly, the solution layer can be solidified uniformly in the thickness direction without any sudden coagulation of the surface layer alone.

Perhaps the flexibility of the sheet materials obtained by the method of the invention is attributed to the abilities of boric acid or polyethylene glycol to act not merely as a coagulation regulator which slows down the initiol coagulation and quickly brings the total coagulation to a conclusion, but also as a plasticizer. According to the method of the invention, the sheet materials of uniform and homogeneous porous structures can be obtained. The method of the invention is thus extremely useful as a method of manufacturing synthetic leathers, particularly sheepskin-like synthetic leathers which combine flexibility with substantialness.

Suitable polymers for use in shaping in accordance with the invention are polyurethane elastomers. The composition of such polyurethane elastomers is composed of (1) a hign-molecular-weight diol such as polyester or polyether having hydroxyl groups at both terminals, (2) an organic diisocyanate, and (3) a chain extender having two or more active hydrogen atoms, e.g. ethylene glycol, 1,4-butanediol, p,p'-methylene dianiline, or hydrazine. As the chain extender (3), it is particularly desirable to use a doil compound as the chain extender, because the texture of the flexible sheet material closely resembles to that of natural leather. Unless it is detrimental to the texture and general properties of the product, any other polymer for shaping use may be mixed and dissolved in the polyurethane elastomer. The amount of such additional polymer depends on the type and properties thereof, but a maximum limit is 50 percent of the weight of the polyurethane elastomer.

The polymer concentration to be chosen varies widely depending upon the intended flexibility, substantialness (resiliency) of the objective product and also upon the type of the polymer itself. In general, the suitable range is from about 15 to about 25 percent in order to obtain the desired substantialness or even in the manufacture of sheepskin-like synthetic leather which is required to have greatest flexibility. It is further possible to extend the range from 10 to 40 percent depending upon the intended applications.

As the solvent for the polymer, dimethyl formamide is suitable. Any other substances such as dimethyl acetamide, dimethyl sulfoxide, tetrahydrofuran, and dioxane which can dissolve the polymer but which do not substantially dissolve the fibrous substrata, may be employed. Of course, mixed solvents may also be used and it is not objectionable that any nonsolvent may be mixed in if the amount is not enough to interrupt the coagulation control to which the present invention is directed.

As substrata to be impregnated with a polymer solution composed essentially of a polyurethane elastomer solution as above described, woven cloth, non-woven cloth and the like of various fibers are used. Above all in order to obtain flexible leather-like sheet materials along with the object of the invention, three dimensional non-woven fiber sheets are most desirable because of their close resemblances to natural leather in view of internal structures, textures, physical properties, etc. of the products. Generally the fibers which form the substrata are preferably fine and flexible. Natural fibers such as cotton and wool and synthetic fibers such as polyamides and polyesters may be used. It is also effective to adopt a method wherein a fiber obtained by melt spinning of a mixture of more than two synthetic polymers, e.g. nylon-polystyrene is shaped into a substratum and at least one of the polymers is dissolved off by extraction with a solvent which does not dissolve the rest of the substratum.

Furthermore, in order to loosen the bond between the impregnated polymer and the fibers of the substratum to obtain more flexible sheets, it is advisable to coat beforehand the surface of fibers which constitute the substratum with a substance having a mold-releasing action and then to impregnate the substratum with the polymer solution or, alternatively, to add a substance having a mold-releasing ability beforehand to the polymer solution to be used for the impregnation purpose. Substances which can effectively serve as mold-releasing agents in the invention are alcohols, carboxylic acids, esters of carboxylic acids, carboxylic amides, amines, nitriles, esters of sulfonic acid, ureids, urethanes, etc. which have long chain alkyl groups containing from 8 to 31 carbon atoms, preferably from 14 to 20 carbon atoms. For example, they include cetyl alcohol, stearyl alcohol, myricyl alcohol, caprylic acid, stearic acid, methylester of stearic acid, sorbitan monostearate, caprylic amide, stearyl amine, stearyl nitrile, stearyl ester of lauryl sulfonate, stearyl urethane, cellulose stearyl urethane, and sorbitol stearyl urethane. Such a mold-releasing agent is added to the impregnating solution in an amount of from 0.1 to 50 percent, preferably from 1 to 10 percent, of the weight of the polymer. Of the compounds mentioned above, those which are solid at room temperature and which are soluble in the polymer solution with or without application of heat but are hardly soluble in the coagulation bath (e.g. alkyl alcohols having 14 or more carbon atoms in the molecule and sorbitol esters of carboxylic acids having 12 or more carbon atoms) are separated as a crystal in the course of coagulation of the polymer solution, so that such compounds have not merely the mold-releasing action but can also be contributory to the formation of a porous structure, only if such coagulating conditions are chosen which will separate such an additive in the form of fine crystals. This additional effect will be more enhanced by combining the addition of such additive with the method of the present invention described in detail hereinbefore, and will render the resulting porous structure even more fine, homogeneous and uniform and improve the flexibility of the final product.

Polyethylene glycol to be used in the invention has preferably an average molecular weight of from 200 to 10,000, preferably from 700 to 10,000. If the molecular weight is less than 200, the compound will be similar to ethylene glycol which has properties near those of non-solvents for polyurethane elastomers or be poor in the affinity with polyurethane elastomers, so that such a compound has no effect as a coagulation regulator and the resulting sheet materials are poor in flexibility. If the molecular weight exceeds 10,000, the compound will have inadequate solubility to solvents and will be limited in the amount to be added, though it may have its effects depending on the intended type of product and the manufacturing conditions to be employed. While the amount of polyethylene glycol to be added is governed by the degree of porosity required to attain desired flexibility, strength, etc. of the sheet material to be made, usually an amount ranging from 1 to 200 percent of the weight of the polymer is appropriate. The amount to be added to a solution for impregnation of three dimensional non-woven fiber sheet is generally increased to a range from 20 to 200 percent because the product is required to possess high degrees of flexibility and substantialness. To a solution for coating the surface of sheet material, it is desirable to add an amount suitably chosen from a range between 1 and 100 percent depending on the intended application, because the product is required to have density and strength in addition to flexibility.

The amount of boric acid to be added depends on the degree of porosity required to maintain the desired flexibility, strength, etc. of the sheet material to be made, but is preferably from 5 to 100 percent of the weight of the polymer. The amount to be added to a solution for impregnation of needle-punched non-woven fiber sheet is generally increased to a range from 15 to 100 percent, because the product is required to possess high degrees of flexibility and substantialness. To a solution for coating the surface of sheet material, it is desirable to add an amount suitably chosen from a range between 5 and 50 percent depending on the intended application, because the product is required to have density and strength in addition to flexibility.

The solution composed essentially of a polyurethane elastomer as already stated is not only impregnated in substrata to form sheet materials but also coated on various substrata and then coagulated to form flexible surface layers on the substrata. As the substrata to be used for the latter purpose, the three dimensional non-woven cloth as above mentioned which has been impregnated with a polymer solution herein specified or sheet materials obtained by coagulating said impregnated cloth are most suitable for obtaining leather-like products. Various other sheet materials of woven and unwoven fabrics and papers may also be employed.

Further, the polymer solution may be spread and coagulated over glass plate, metal plate, synthetic resin plate or roll to produce flexible films, which can thereafter be used to cover the surfaces of sheet materials and other articles, for example interior ornaments and furnitures, in order to improve the texture, touch, appearance, etc. of the latter.

In the practice of the present invention, coagulation of the polymer solution is an important step, because such a step dictates the inner structure, texture, and physical properties of the shaped product. It is particularly important in order to obtain bulky shaped products by improving the inner structure of the coagulated polymer layer, for example by increasing the degrees of porosity and homogeneity, thereby to satisfy the requirements for flexibility, substantialness, thickness to the touch, draping quality and other properties, to which the present invention is directed. Concentration, viscosity, etc. of the polymer solution are selected according to the intended flexibility and substantialness of the sheet materials to be made. Coagulating conditions are varied depending upon such a selection and they are usually controlled by using a mixture of solvent and non-solvent for the polymer, e.g. an aqueous solution of dimethyl formamide or a solution of dimethyl acetamide in methanol, with suitable concentration, temperature, and dipping time, without using non-solvent e.g. water or alcohol, singly. As the solvent concentration of the mixed solution and the coagulation temperature increase, the initial coagulation is generally retarded and formation of skin layers is prevented. However, too high concentration and temperature are not desirable, because they cause partial dissolution of the polymer, which in turn roughens the surface of the product or impairs the surface strength of the product. On the other hand, too slow coagulation will render the shaped article dense and hard in texture. In order to eliminate such disadvantages, it is preferable to coagulate the polymer solution initially with a high concentration and at an elevated temperature and then gradually lower the concentration and temperature until the coagulation is completed.

As desirable conditions for coagulation, a ratio by weight of solvent to non-solvent in the coagulation bath between 10:90 and 80:20 is suitable for obtaining a flexible sheet material having a homogeneous porous structure, and usually a ratio in the range of from 20:80 to 60:40 gives the best result. As pointed out above, the coagulation temperature is also an important factor for the coagulation velocity. Generally, the optimum condition is realized by decreasing the temperature with an increase in the concentration of the solvent in the coagulation bath or vice versa. The optimum condition is usually obtained in the range of from room temperature, or in the vicinity of 20° C., to 90° C., preferably from 20° to 60° C.

If the solvent for the polymer remains in the sheet product which has been substantially coagulated, it may break down the once formed porous structure in a step of drying the resulting sheet material. Therefore, it is usually necessary to wash the product thoroughly to remove the solvent. As already stated, however, the sheet materials obtained by the method of the invention has no skin layer and wholly consists of a continuous and uniform porous structure and accordingly can be freed from residual solvent at an extremely high efficiency by washing with warm water for a short period of time, usually ranging from 30 minutes to one hour. Collapsibility of the pores during the course of drying depends largely upon the inner structure of the particular sheet. In a sheet material obtained by the method of the invention, the solvent will so quickly be evaporated, even if the solvent remains, so that it will scarcely destroy the porous structure. For example, the solvent remaining in an amount of from 10 to 20 percent will not cause such trouble. After all, a flexible sheet material having a uniform porous structure can be obtained.

The present invention is illustrated by the following examples. Unless otherwise specified, parts and percent are all expressed by weight.

EXAMPLES 1 AND 2 (AND REFERENTIAL EXAMPLE 1)

Polyurethane elastomer composed of polybutylene glycol having an average molecular weight of 2,000, p,p'-diphenylmethane diisocyanate and 1,4-tetramethylene glycol (at a molar ratio of 1:4:3), polyethylene glycol having an average molecular weight of 4,000 (hereinafter referred to as "PEG"), and dimethyl formamide were used to prepare solutions of the following compositions:

| | Parts | | |
|---|---|---|---|
| | Polyurethane elastomer | Polyethylene glycol | Dimethyl formamide |
| Example 1 | 20 | 1 | 80 |
| Example 2 | 20 | 10 | 80 |
| Ref. Ex. 1 | 20 | 0 | 80 |

Each of the above solutions was flown and spread over glass plate to form a film having a thickness of one millimeter, and coagulated by treatment with an aqueous solution containing 30% of dimethyl formamide at 25° C. for 20 minutes.

The solidified film was washed with water at temperatures between 60° and 70° C. for one hour to remove the solvent, and then dried with hot air at 80° C. The appearances, flexibility and other properties of the films thus obtained are shown in Table 1. The uniformity of their cross sections varied depending on whether polyethylene glycol had been added or not. Remarkable differences were also observed in the flexibility and moisture permeability of the films. Moreover, as seen from the table the difference in the thickness of the finished films, in which the above described solutions were spread in a thickness of 1 mm., shows that the shrinkage is smaller by combining polyethylene glycol.

EXAMPLES 3 AND 4 (AND REFERENTIAL EXAMPLE 2)

The same polyurethane elastomer as used in Example 1 was used together with the same polyethylene glycol as in Example 1, dimethyl formamide, stearyl alcohol and sorbitan monostearate were used to prepare solutions of the following compositions:

| | Parts | | | | |
|---|---|---|---|---|---|
| | Polyurethane elastomer | Polyethylene glycol | Dimethyl formamide | Stearyl alcohol | Sorbitan monostearate |
| Example 3 | 20 | 1 | 80 | 1 | 1 |
| Example 4 | 20 | 10 | 80 | 1 | 1 |
| Ref. Ex. 2 | 20 | 0 | 80 | 1 | 1 |

NOTE.—The solutions of Examples 3 and 4 and Referential Example 2 are equivalent, respectively, to the solutions of Examples 1 and 2 and Referential Example 1 plus stearyl alchol and soribtan monostearate each.

Each of the solutions prepared as above was flown and spread over glass plate to a film of thickness of 1 mm. and coagulated in a bath of an aqueous solution containing 30 percent of dimethyl formamide at 30° C. for 20 minutes. The solidified film was washed with water at a temperature of from 60° to 70° C. for one hour to eliminate the solvent therefrom, and then dried with hot air at 80° C. The properties and appearances of the films thus obtained are shown in Table 2. As will be clear from Table 2, the addition of stearyl alcohol and sorbitan monostearate generally improved the flexibility and moisture permeability to considerable degrees over those of preceding examples (i.e. Examples 1 and 2 and Referential Example 1). Particularly, the use of those additives in combination with polyethylene glycol markedly enhances the effects of shrinkage inhibition, uniformalization and softening of sponge structure, and of improving the draping quality of the products.

TABLE 2

| | Example 3 | Example 4 | Ref. Ex. 2 |
|---|---|---|---|
| Thickness (mm.) | 0.66 | 0.78 | 0.45. |
| Apparent sp. gr. | 0.31 | 0.25 | 0.44. |
| Young's modulus (kg./mm.$^2$) | 0.32 | 0.24 | 1.05. |
| Gas permeability (time) | 1 min. | 30 sec. | 7 min. |
| Moisture permeability (g./m.$^2$/24 hr.) | 5,100 | 6,700 | 3,800. |
| Texture | Flexible and thick to the touch. | Extremely flexible and thick to the touch. | Rather hard and paperlike. |
| Appearance of cross section | Uniform micropores | Uniform micropores | Skin layer and mixture of micropores and much macropores. |

EXAMPLE 5

A solution was prepared from 15 parts of polyurethane elastomer composed of polyethylene propylene (9:1 mole) adipate of an average molecular weight of 2,000 which had hydroxyl groups at both terminals, p,p'-diphenylmethane diisocyanate and ethylene glycol (at a molar ratio of 1:5:4), 30 parts (or 200 percent of the elastomer amount) of polyethylene glycol having an average molecular weight of 1,000, and 85 parts of dimethyl formamide. With the solution thus prepared, a three dimensional non-woven cloth formed of mix-spun fibers of nylon-polystyrene (50:50) having a size of 2 deniers and fiber length of 5 cm., and which weighed 250 g./m.$^2$ and had an apparent specific gravity of 0.14 was impregnated. The impregnated cloth was treated and coagulated with an aqueous solution containing 30 percent of dimethyl formamide at 30°

TABLE 1

| | Example 1 | Example 2 | Ref. Ex. 1 |
|---|---|---|---|
| Thickness (mm.) | 0.55 | 0.64 | 0.37. |
| Apparent sp. gr. | 0.36 | 0.32 | 0.58. |
| Young's modulus (kg./mm.$^2$) | 0.62 | 0.43 | 1.42. |
| Gas permeability (time) | 7 min. | 3 min. | Over 2 hrs. |
| Moisture permeability (g./m.$^2$/24 hr.) | 3,800 | 4,200 | 2,300. |
| Texture | Flexible and substantial | Flexible and thick to the touch. | Hard. |
| Appearance of cross section | Microporous throughout with some oblong gaps. | Uniform and homogeneous micropores throughout. | Skin layer with round macropores therebelow. |

C. for 30 minutes, washed with water at about 70° C. for one hour, and dried at 80° C. Next, the product was dipped in toluene at 80° C. to dissolve off the polystyrene from the nylon-polystyrene mix-spun fibers. The toluene was removed from the substratum by azeotropic distillation with water at 90° C. and thereafter the product was dried with water at 80° C. A sheet material having flexible leather-like texture was obtained.

EXAMPLES 6 AND 7 (AND REFERENTIAL EXAMPLE 3)

Polyurethane elastomer composed of polybutylene glycol having an average molecular weight of 2,000, p,p'-diphenylmethane diisocyanate and 1,4-tetramethylene glycol (at a molar ratio of 1:4:3), stearyl alcohol, sorbitan monostearate, dimethyl formamide and boric acid were used to prepare solutions of the following compositions:

|  | Parts | | |
| --- | --- | --- | --- |
|  | Example 6 | Example 7 | Ref. Ex. 3 |
| Polyurethane elastomer | 20 | 20 | 20 |
| Stearyl alchol | 1 | 1 | 1 |
| Sorbitan monostearate | 1 | 1 | 1 |
| Dimethyl formamide | 80 | 80 | 80 |
| Boric acid | 1 | 10 |  |

Each of the above solutions was flown and spread over glass plate to form a film having a thickness of 1 mm. and coagulated by treatment with an aqueous solution containing 30 percent of dimethyl formamide at 35° C. for 20 minutes. The solidified film was washed with water at 70° C. for one hour to remove the solvent, and then dried with hot air at 80° C. The appearance, flexibility and other properties of the films thus obtained are shown in Table 3. The uniformity of their cross sections varied depending on whether boric acid had been added or not. Remarkable differences were also observed in the flexibility and moisture permeability of the films. Moreover, as seen from the table the difference in the thickness of the films, in which the above described solutions were spread in a thickness of 1 mm., shows that the shrinkage is smaller by combining boric acid.

TABLE 3

|  | Example 6 | Example 7 | Ref. Ex. 3 |
| --- | --- | --- | --- |
| Thickness (mm.) | 0.51 | 0.68 | 0.39. |
| Apparent sp. gr | 0.38 | 0.30 | 0.53. |
| Young's modulus (kg./mm.$^2$) | 0.55 | 0.21 | 1.00. |
| Gas permeability (time) | 2 min | 80 sec | 7 min. |
| Moisture permeability (g./m.$^2$/24 hr.) | 5,600 | 6,800 | 3,600. |
| Texture | Flexible and tenacious | Extremely flexible and thick to the touch | Rather hard and paperlike. |
| Appearance of cross section | Uniform micropores | Uniform micropores | Skin layer with micropores and much macropores therebelow. |

EXAMPLE 8 (AND REFERENTIAL EXAMPLE 4)

Polyurethane elastomer composed of polyethylene propylene (molar ratio 9:1) adipate glycol having an average molecular weight of 2,000 p,p'-diphenylmethane diisocyanate and ethylene glycol (molar ratio 1:5:4), stearyl alcohol, sorbitan monostearate and boric acid were used to prepare solutions of the following compositions:

|  | Parts | |
| --- | --- | --- |
|  | Example 8 | Ref. Ex. 5 |
| Polyurethane elastomer | 20 | 20 |
| Stearyl alcohol | 1 | 1 |
| Sorbitan monostearate | 1 | 1 |
| Dimethyl formamide | 80 | 80 |
| Boric acid | 6 | 0 |

With each of the solutions prepared, a needle-punched non-woven fiber sheet formed of 2-denier nylon-polystyrene (50:50) mix-spun fibers, 5 cm. in fiber length, which weighed 250 g./m.$^2$ and had an apparent specific gravity of 0.14 was impregnated. The impregnated cloth was further coated over the surface with the same solution in an amount of 40 g./m.$^2$ in terms of the weight of the elastomer. Each sample was then coagulated by treatment with an aqueous solution containing 30 percent of dimethyl formamide kept at 35° C. for 30 minutes, washed wtih water at about 70° C. for one hour, and air dried at 80° C. The sheet obtained was further dipped in toluene at 80° C. to dissolve off polystyrene from the fibers. The residual toluene in the sheet was azeotropically distilled with water at 90° C., and then the sheet was air dried at 80° C.

When the sheet materials thus obtained were compared, the sheet of Ref. Example 4 had a hard and paperlike texture, while the sheet of Example 8 possessed a flexible sheepskinlike texture having good flexibility, substantialness and draping quality. The physical properties of the sheet materials which were subsequently baffed on the rear side to a total thickness of about 0.8 mm. were as shown in Table 4.

TABLE 4

|  | Example 8 | Ref. Ex. 4 | Sheepskin |
| --- | --- | --- | --- |
| Weight (g./m.$^2$) | 290 | 320 | 260 |
| Thickness (mm.) | 0.81 | 0.83 | 0.70 |
| Specific gravity | 0.36 | 0.39 | 0.37 |
| Strength (kg./mm.$^2$) | 0.95 | 1.14 | 1.35 |
| Elongation (percent) | 56 | 40 | 41 |
| Young's modulus (kg./mm.$^2$) | 1.7 | 4.8 | 1.7 |
| Moisture permeability | 7,200 | 4,000 | 6,720 |

EXAMPLE 9 (AND REFERENTIAL EXAMPLE 5)

From the same polyurethane elastomer as used in Example 8, cetyl alcohol, cellulose stearyl urethane, dimethyl formamide and boric acid, elastomer solutions of the following compositions were prepared:

|  | Parts | |
| --- | --- | --- |
|  | Example 9 | Ref. Ex. 5 |
| Polyurethane elastomer | 24 | 12 |
| Cetyl alcohol | 2.4 | 1.2 |
| Cellulose stearyl urethane | 1.2 | 0.6 |
| Dimethyl formamide | 76 | 88 |
| Boric acid | 9.6 |  |

Using the above solutions sheet materials were made by the same procedure as described in preceding Example 8.

The physical properties of the sheet materials thus obtained are shown in Table 5.

TABLE 5

|  | Example 9 | Ref. Ex. 5 |
| --- | --- | --- |
| Weight (g./m.$^2$) | 320 | 250 |
| Thickness (mm.) | 0.78 | 0.80 |
| Specific gravity | 0.41 | 0.31 |
| Strength (kg./mm.$^2$) | 0.98 | 0.82 |
| Elongation (percent) | 52 | 58 |
| Young's modulus (kg./mm.$^2$) | 1.8 | 2.0 |
| Moisture permeability (g./m.$^2$/24 hr.) | 5,800 | 6,200 |

As seen from the table, both possess aproximately same Young's modulus values and have similar flexibilities. However, the sheet of Example 9, which used a highly concentrated elastomer solution, had a higher filling rate and was more substantial to the touch and exhibited greater draping quality than the product of Ref. Example 5. This means that boric acid protects the product against the loss of flexibility which is otherwise caused by the use of a highly concentrated elastomer solution.

What we claim is:

1. A method of manufacturing soft and flexible porous sheet materials which comprises: impregnating or coating a porous substrate with a solution of a polyurethane elastomer, said polyurethane elastomer being prepared from a polymer glycol, an organic diisocyanate and a chain extender having two or more active hydrogen atoms, and said solution containing from about 10 to 40% of the polyurethane elastomer, and boric acid in an amount of from 5 to 100% of the weight of the polyurethane elastomer or polyethylene glycol having an average molecular weight of from 700 to 10,000 in an amount of from 1 to 200% of the weight of the polyurethane elastomer; coagulating said solution by treatment of the coated or impregnated substrate with a coagulating bath comprising a mixture of solvent and non-solvent for the polyurethane elastomer in a ratio by weight of from 10:90 to 80:20; and drying the resultant sheet material.

2. A method according to claim 1 wherein the solution also contains a mold-releasing agent in an amount of from 0.1 to 50% of the weight of the polyurethane elastomer, said mold-releasing agent being alcohol, carboxylic acid, ester of carboxylic acid, carboxyilc amide, ester of sulfonic acid, ureid or urethane containing a long chain alkyl group.

3. A method according to claim 1 wherein (1) the solution consists essentially of from 15 to 30% of the polyurethane elastomer and polyethylene glycol in an amount of from 1 to 200% of the weight of the polyurethane elastomer, (2) coagulation is carried out by treatment with a mixture of solvent and non-solvent for the polyurethane elastomer in a ratio by weight of from 20:80 to 60:40, at a temperature of from 20 to 90° C., and (3) said substrate is woven or non-woven fabric.

4. A method according to claim 1 wherein (1) the solution consists essentially of from 15 to 30% of the polyurethane elastomer and boric acid in an amount of from 5 to 100% of the weight of the polyurethane elastomer, (2) coagulation is carried out by treatment with a mixture of solvent and non-solvent for the polyurethane elastomer in a ratio by weight of from 20:80 to 60:40, at a temperature of from 20 to 90° C., and (3) said substrate is woven or non-woven fabric.

5. A method according to claim 1, wherein the solution contains from 15 to 30% of the polyurethane elastomer.

6. A method according to claim 1 wherein the ratio is from 20:80 to 60:40.

7. A method according to claim 1, wherein the coagulation is carried out at a temperature of from 20 to 90° C.

8. A method according to claim 1 wherein said substratum is woven or non-woven fabric.

References Cited

UNITED STATES PATENTS

| | | | |
|---|---|---|---|
| 3,000,757 | 9/1961 | Johnston et al. | 117—135.5 X |
| 3,190,765 | 6/1965 | Yuan | 117—63 |
| 3,190,766 | 6/1965 | Yuan | 117—63 |
| 3,214,290 | 10/1965 | Larner et al. | 117—135.5 |
| 3,264,134 | 8/1966 | Vill et al. | 117—63 |
| 3,348,963 | 10/1967 | Fukushima et al. | 117—63 |
| 3,369,925 | 2/1968 | Matsushita et al. | 117—161 X |
| 3,400,187 | 9/1968 | Farrow | 117—62.2 X |
| 3,403,046 | 9/1968 | Schwacke et al. | 117—135.5 X |
| 3,406,038 | 10/1968 | Moren | 117—62.1 |
| 3,418,198 | 12/1968 | Einstman | 117—63 X |

M. R. LUSIGNAN, Assistant Examiner

WILLIAM D. MARTIN, Primary Examiner

U.S. Cl. X.R.

117—76, 135.5, 138.8, 124, 140, 161